United States Patent [19]

Arai et al.

[11] Patent Number: 5,343,246
[45] Date of Patent: Aug. 30, 1994

[54] IMAGE SENSING APPARATUS

[75] Inventors: Hideyuki Arai; Hirofumi Suda; Kitahiro Kaneda, all of Kanagawa, Japan

[73] Assignee: Canon Kabushiki Kaisha, Tokyo, Japan

[21] Appl. No.: 23,487

[22] Filed: Feb. 25, 1993

Related U.S. Application Data

[63] Continuation of Ser. No. 633,973, Dec. 26, 1990.

[30] Foreign Application Priority Data

Dec. 29, 1989 [JP] Japan .................................. 1-343135

[51] Int. Cl.$^5$ ...................... H04N 5/232; H04N 5/238
[52] U.S. Cl. .................................. 348/363; 348/354; 354/402
[58] Field of Search ............... 358/228, 227, 225, 909, 358/213.19; 354/402, 406, 429-431, 433; 250/201.4, 203.1, 205; 348/362, 363, 354; H04N 5/232, 5/238

[56] References Cited

U.S. PATENT DOCUMENTS

| | | |
|---|---|---|
| 4,638,367 | 1/1987 | Sakane et al. .................. 358/228 |
| 4,774,401 | 9/1988 | Yamada et al. .................. 250/201 |
| 5,075,778 | 12/1991 | Saito .................................. 358/228 |

FOREIGN PATENT DOCUMENTS

| | | | |
|---|---|---|---|
| 0220977 | 1/1990 | Japan ............................. | H04N 2/38 |
| 2219461 | 6/1989 | United Kingdom .......... | H04N 2/38 |

*Primary Examiner*—James J. Groody
*Assistant Examiner*—Glenton B. Burgess
*Attorney, Agent, or Firm*—Robin, Blecker, Daley & Driscoll

[57] ABSTRACT

An image sensing apparatus comprises a light measuring circuit for performing a weighted light measurement on the basis of a light measuring area set in a predetermined position within an image sensing plane, a detecting circuit for detecting the levels of the luminance signals obtained from a plurality of detecting areas set within the image sensing plane, a discriminating circuit for discriminating the state of an object being photographed on the basis of the output of the detecting circuit, a compensation circuit for compensating a light measurement signal produced by the light measuring circuit in a backlighting photographic state, and a compression circuit for controlling a compression point and/or a compression rate of a high-luminance signal in accordance with the amount of compression performed by the compression circuit.

31 Claims, 4 Drawing Sheets

IMAGE SENSING APPARATUS

This is a continuation application under 37 CFR 1.62 of prior application Ser. No. 633,973, filed Dec. 26, 1990.

BACKGROUND OF THE INVENTION

1. Field of the Invention

This invention relates to image sensing apparatuses such as video cameras, or still video cameras.

2. Description of the Related Art

It has been usual to provide the image sensing apparatus such as video cameras and still cameras with an automatic exposure control device for automatically setting the exposure of the image sensor of the apparatus to an optimum value. In a case where the luminance difference between an object to be photographed and the background is large as, for example, in backlighting situations, the object image is blackened and hence without contrast details, giving an unnatural impression. To avoid this, a method of measuring light with an emphasis on a portion of the image sensing plane, for example, the interior of a frame set at the center of the image sensing plane where an object of principal photographic interest takes its place with a high probability is proposed. Another proposed method is to make use of a plurality of light measuring frames of different area size in the image sensing plane, by which an evaluative light measurement is carried out to compensate the light measurement information.

FIG. 1 is a block diagram illustrating the construction of the automatic exposure control device having a capability of compensating for backlighting by the evaluative light measurement method used in the home video camera, etc.

In FIG. 1, the video camera has a photographic lens 1, an iris 2 for regulating the intensity of entering light and an image sensor 3 such as CCD. The device further comprises a buffer amplifier 4, an AGC (Automatic Gain Control) circuit 5, a light measuring circuit 8 for performing a light measurement based on the output of the buffer amplifier 4 in accordance with a fixed-frame signal output from a fixed-light-measuring-frame signal generating circuit 10 and a compensation signal output from a backlighting compensation circuit 12, another light measuring circuit 9 which performs a light measurement based on the output of the AGC circuit 5 similarly to the light measuring circuit 8, an iris drive circuit 7 for driving the iris 2 to a size of aperture opening controlled in accordance with the output of the light measuring circuit 8, an encoder circuit 6, a video signal output terminal 13, and an input terminal 11 at which a composite synchronizing signal for setting a light measuring frame is received. Responsive to the composite synchronizing signal, the fixed-light-measuring-frame signal generating circuit 10 produces the fixed-light-measuring-frame signal for gating the video signal so that only that part of the video signal which corresponds to the position of the light measuring frame set on the image sensing plane is allowed to pass through, circuits 8 and 9 with the result that light measurement is carried out based on the signal obtained within the light measuring frame.

The device of such a construction operates as follows: The light having passed through the lens 1 and the iris 2 to the image sensor 3 is photoelectrically converted into an electrical signal. After having been subjected to signal processing such as gain control in the AGC circuit 5, the electrical signal is separated into a luminance signal and color-difference signals, which are then applied to the encoder circuit 6. The signals processed by the encoder circuit 6 are output as a composite video signal from the video signal output terminal 13. Further, in accordance with the level of the output signal of the AGC circuit 5, discrimination of whether or not backlighting is occurring is made. From the backlighting compensation circuit 12, the compensation signal is sent to the light measuring circuits 8 and 9, so that the iris 2 and the AGC circuit 5 are driven. Thus, the light measurement is compensated for the backlighting to prevent the object image from being blackened to be without contrast details by the bright background.

However, as far as the object is concerned, the backlighting compensation of the above-described automatic exposure control device ensures formation of its image without being blackened to. But, the level of that portion of the video signal which corresponds to the background of high luminance rises so abnormally as to clip or non-linearly compress the video signal. Therefore, the contract ratio of the bright portion is caused to diminish. Hence, the prior known device has a drawback of providing a picture having portions washed out.

SUMMARY OF THE INVENTION

The present invention has been made to eliminate the above-described problem and its first object is to provide an image sensing apparatus which assures possibility of making always accurate, natural exposure control regardless of any lighting situations of the object.

A second object of the invention is to provide an image sensing apparatus which, when compensating for backlighting, can improve the latitude of high luminance portions, improve coloring of high luminance portions and extend the dynamic range of luminance signals.

A third object of the invention is to provide a video camera apparatus which is able to always adaptively make exposure compensation regardless of situations of the object.

To achieve such objects, according to the invention, in a preferred embodiment thereof, an image sensing apparatus is disclosed, comprising light measuring means for performing a weighted light measurement on the basis of a light measuring area set in a predetermined position within an image sensing plane, detecting means for detecting the levels of luminance signals obtained from a plurality of detecting areas set within the image sensing plane, discriminating means for discriminating a state of an object to be photographed on the basis of an output of the detecting means, compensating means for compensating a light measurement signal output from the light measuring means in a backlighting photographic state, and compressing means for controlling a compression point and/or a compression rate of a high-luminance signal in accordance with the amount of compensation of the compensating means in the backlighting photographic state.

A fourth object of the invention is to provide an image sensing apparatus which enables adaptive compensation to be carried out so that even when exposure control is made by the intention of the operator, the picture does not become unnatural.

To achieve this object, according to the invention, in another preferred embodiment thereof, an image sensing apparatus is disclosed, comprising light measuring means for performing a weighted light measurement on the basis of a light measuring area set in a predetermined position within an image sensing plane, compensating means for compensating a light measurement signal output from the light measuring means in a backlighting photographic state by a manual operation from externally of the apparatus, and compressing means for controlling a compression point and/or a compression rate of a high-luminance signal in accordance with the amount of compensation of the compensating means in the backlighting photographic state.

A fifth object of the invention is to provide an image sensing apparatus which, in backlighting photography, compensates for that backlighting by an amount, in accordance with which the compression point and/or compression rate of the high-luminance signal is controlled so that improvement of the latitude of the high luminance portion, improvement of the coloring, and extension of the dynamic range of the luminance signal are possible.

A sixth object of the invention is to provide an image sensing apparatus which, when backlighting compensation operates, controls the compression start point and the compression rate of the high-luminance signal in accordance with the amount of compensation for that backlighting to thereby prevent other portions of high luminance than an object to be photographed from being emphasized so that washing out or the like does not take place, thus making it possible to improve the latitude of the high luminance portions, to improve the coloring of the high luminance portions, and to extend the dynamic range of the luminance signal.

Other objects and features of the invention will become apparent from the following description of thereof and by reference to the drawings.

DETAILED DESCRIPTION OF THE PREFERRED EMBODIMENTS

The image sensing apparatus in the invention is described in great detail in connection with embodiments thereof by reference to the drawings.

Figure 2:
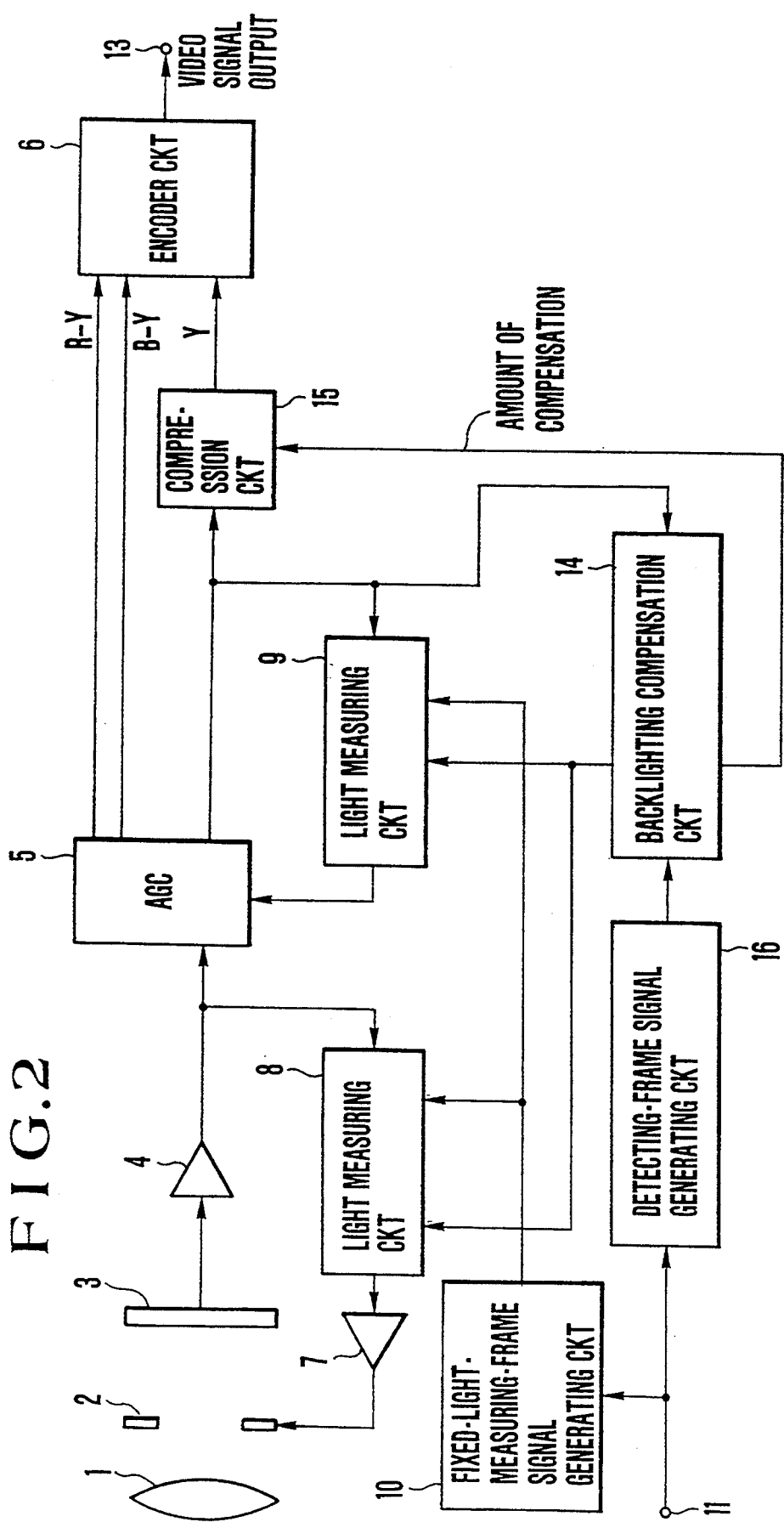
FIG. 2 is a block diagram of a first embodiment of an image sensing apparatus according to the invention.

FIG. 2 shows the first embodiment of the image sensing apparatus in the invention, comprising a photographic lens 1, an iris 2 for limiting the amount of entering light, an image sensor 3, a buffer amplifier 4, an AGC (Automatic Gain Control) circuit 5, an encoder circuit 6, an iris drive circuit 7, a light measuring circuit 8 for controlling the size of aperture opening of the iris 2, another light measuring circuit 9 for controlling the gain of the AGC circuit 5, a fixed-light-measuring-frame signal generating circuit 10 for gating a video signal in such a manner that only that portion of the video signal which corresponds to the interior of a light measuring area set on an image sensing plane is permitted to pass through, circuits 8 and 9 a composite synchronizing signal input terminal 11, and a video signal output terminal 13.

Figure 1:
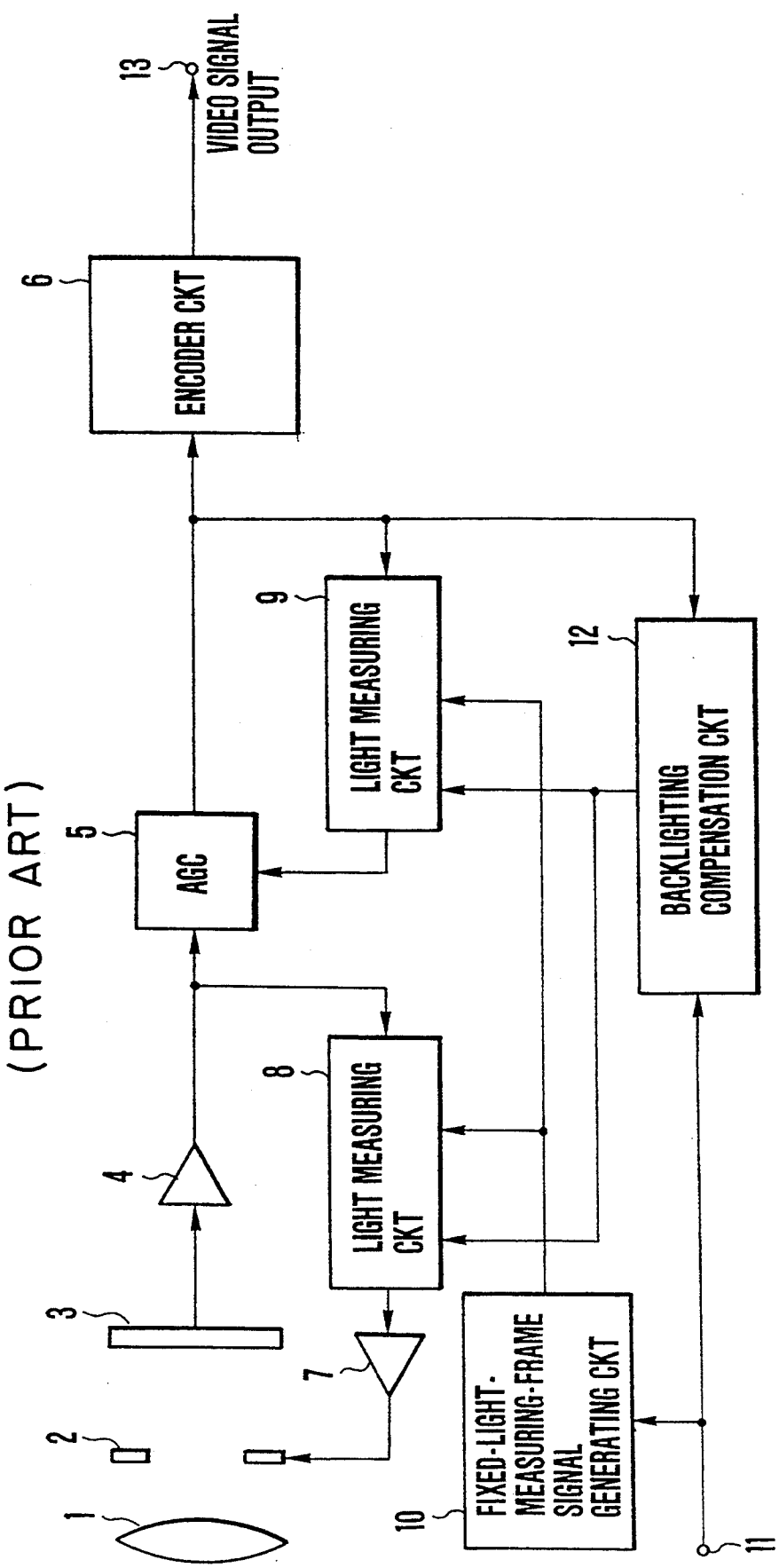
FIG. 1 is a block diagram illustrating the construction of the usual image sensing apparatus.

To this juncture, the arrangement is the same as in the automatic exposure control device shown in FIG. 1.

Reference numeral 14 denotes a backlighting compensation circuit (which may be in the form of a microcomputer). A compression circuit 15 is provided in between the AGC circuit 5 and the encoder circuit 6 to compress the luminance signal Y output from the AGC circuit 5 on the basis of the amount of compensation output from the backlighting compensation circuit 14, thus suppressing the high luminance portion which has been emphasized by the backlighting compensation to improve the latitude of that high luminance portion and extend the dynamic range. Thereby, the picture is prevented from being washed out or the like.

Reference numeral 16 denotes a detecting-frame signal generating circuit for dividing the image sensing plane into a plurality of detecting areas on the basis of the composite synchronizing signal supplied from the composite synchronizing signal input terminal 11, so that the levels of the luminance signals corresponding to the detecting areas are detected individually, computed, and evaluated. The use of such a plurality of detecting areas in predetermined positions on the image sensing plane in combination with the means for determining the level of the luminance signal corresponding to each of the detecting areas provides the possibility of discriminating the states of the image such as backlighting, normal lighting and over-frontlighting. More details will be described later.

Light entering through the lens 1 passes through the iris 2 to the image sensor 3, where it is photoelectrically converted into an electrical signal. This signal is applied through the buffer amplifier 4 to the AGC circuit 5, where it is subjected to AGC and gamma processing, and is output in the separated form of a luminance signal Y and color-difference signals R-Y and B-Y. Of the outputs of the AGC circuit 5, the luminance signal Y is applied to the backlighting compensation circuit 14 (or the microcomputer). Here, a discrimination of the state of the image is carried out. If it is determined to be a backlighting photographic state, backlighting compensation proportional to that state is then carried out.

The operation of discriminating the photographic state by the backlighting compensation circuit 14 is now described. The detecting-frame signal generating circuit 16 supplies, on the basis of the composite synchronizing signal, a detecting-frame signal for setting a plurality of detecting areas on the image sensing plane to the backlighting compensation circuit 14. The backlighting compensation circuit 14 determines the levels of the luminance signals from a plurality of detecting areas into which the image sensing plane is divided, and computes them by predetermined formulas, so that the photographic state is discriminated.

Figure 3:
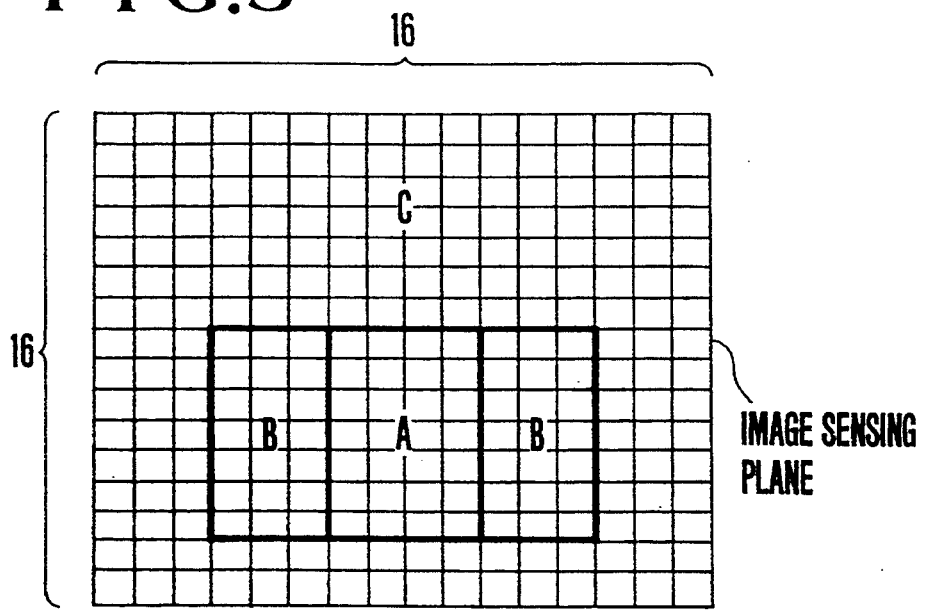
FIG. 3 is a diagram for explaining the method of discriminating a backlighting photographic state in the invention.

FIG. 3 in plan view shows the relationship of the positions of a plurality of detecting areas set in division on the image sensing plane. As is apparent from FIG. 3, within the entire area C of the image sensing plane, a central detecting area A is set in a position downwardly away from the center of the area of the image sensing plane, and left and right detecting areas B are set on either side of the central detecting area A. The reason why the central detecting area A is put in the lower half is that, since the sky or like bright object enters the upper half with a high probability, erroneous detection of this for an object of principal interest is prevented from occurring. To make up the areas A and B, in the present embodiment, the image sensing plane is divided into sixteen blocks in either of the longitudinal and lateral directions, and one block is used as a unit in such layouts as shown in FIG. 3.

Based on the detecting-frame signal supplied from the detecting-frame signal generating circuit 16, the backlighting compensation circuit 14 sets the detecting areas A, B and C of different area size as shown in FIG. 3 and then detects the luminance signals of the portions corresponding to those detecting areas of a video signal. As the luminance signals each are integrated to obtain a signal value, these signal values are then computed to discriminate whether or not the object being photographed is in a backlighting state.

Specifically speaking, the discrimination is carried out by the following formulas:

$$\overline{A+B} - A > X \quad (1)$$

$$\overline{B+C} - A > Y \quad (2)$$

(where X and Y are constants, A, B and C are the average values of the luminance levels in the detecting areas A, B and C respectively, and $\overline{A+B}$ and $\overline{B+C}$ are the mean values of the luminance levels of the corresponding areas.) Based on the formula (1), the difference between the mean luminance level of the combined areas of the central detecting area A and its side detecting areas B and the luminance level of the central detecting area A is computed. Therefore, the satisfaction of the inequality (1) means that the luminance of the marginal portion of the central detecting area is higher by at least the predetermined value X than that of the central detecting area. But, relying on only the formula (1) or only the central zone of the image sensing plane cannot permit sufficient discrimination between the backlighting state and an uneven luminance of the object. Therefore, computation of the formula (2) is carried out in parallel. That is, the formula (2) is to compare the central detecting area A with all the other areas. Satisfaction of the inequality (2) means that the other area than the central detecting area A, or the marginal zone, is higher in luminance level by at least the predetermined value Y over the entirety than the central detecting area A, thus being very bright.

Alternatively, relying on only the formula (2) leads to some possibility of making an erroneous judgment in such a situation that an object of high luminance such as the sky enters part of the image sensing plane. In this case, there is a possibility that, although the central detecting area A gives a sufficiently high luminance, the increase of the luminance of the background or $\overline{B+C}$ is mistaken for a backlighting. Therefore, the information about the central zone of the image sensing plane, too, is taken into consideration by using another condition as expressed by the inequality (1). Thus, the accuracy of discrimination of whether or not the object is in a backlighting state is increased.

From the foregoing reasons, judgment of backlighting states are made by setting forth the two criteria or formulas (1) and (2). When both conditions are satisfied at once, that is, when its background or its marginal areas B and C is higher in luminance level than the central detecting area A by more than the predetermined value, and when the mean luminance level of the central detecting area A and its flanking areas B is higher than the luminance level of the central detecting area A by more than the predetermined value, the given lighting situation is discriminated as a backlighting state.

Upon detection of occurrence of the backlighting state by the above-described method, the backlighting compensation circuit 14 supplies the compensation signal for compensating for that backlighting state to the light measuring circuits 8 and 9. Therefore, the iris 2 moves in a direction to open, and the gain AGC circuit 5 moves in a direction to rise. In other words, compensation is made in such a way that the blackened object image comes out with increasing contrast of its details. Also, at this time, the backlighting compensation circuit 14 controls the amount of compensation by monitoring the output of the AGC circuit 5, or the luminance signal, so that the luminance signal of the object whose image is liable to be blackened is kept always constant at an arbitrary value.

In the backlighting compensation mode, the image is prevented from being blackened by the above-described backlighting compensation operation. However, the luminance level of the entire picture is caused to rise. Therefore, the level of the luminance signal for the bright background becomes abnormally high with the result that the image of the background is washed out. On this account, in the invention, high-luminance compression of the luminance signal output of the AGC circuit 5 is carried out by the compression circuit 15. That is, in the compression circuit 15, a compression start point and a compression rate of the high-luminance signal are controlled in accordance with the amount of compensation output from the backlighting compensation circuit 14, so that the latitude of the high-luminance portions is improved.

Figure 4:
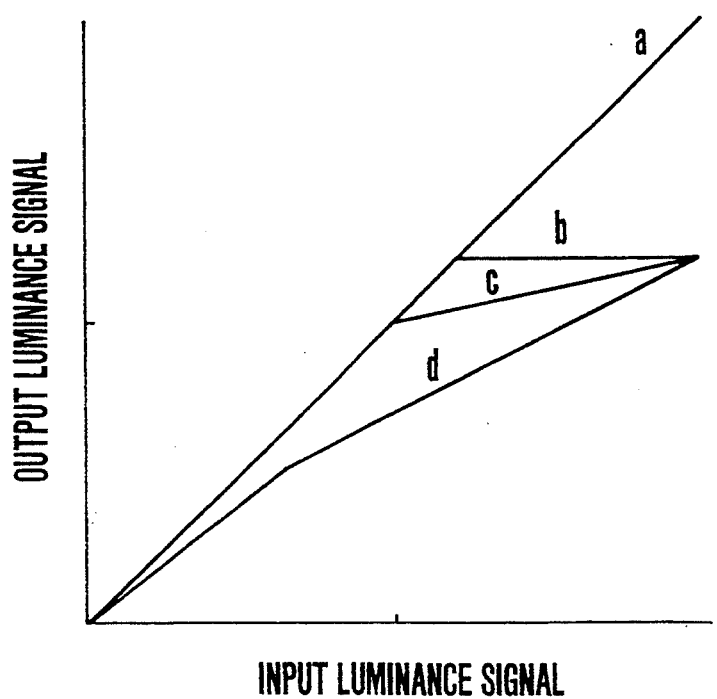
FIG. 4 shows characteristic curves of the compression circuit 15.

The compression characteristics of the compression circuit 15 are shown in FIG. 4.

A characteristic curve "a" is for a case of no luminance compression or clipping, another characteristic curve "b" for a case of clipping the video signal, another characteristic curve "c" for a case of compressing the high-luminance portions, and another characteristic curve "d" for a case of improving the latitude of the high-luminance portions over the characteristic curve "c" by varying the compression rate and its compression start point. As a criterion for selectively operating the characteristics of FIG. 4, the amount of compression of the backlighting compensation circuit 14 is used. The characteristic "a" is selected when the amount of compensation is zero, or when backlighting compensation is not to be done. The characteristic "b" is selected when the amount of compensation is small. The characteristic "c" is selected when the amount of compensation is middle. The characteristic "d" is selected when the amount of compensation is large. In other words, as the amount of compensation varies: 0→small→middle→large, selection of the compression characteristic changes: "a"→"b"→"c"→"d". It is to be noted that though the invention has been described in connection with discrete characteristics "a", "b", "c" and "d" for the purpose of convenience, it is to be understood that for continuously varying amounts of compensation, the characteristic may be varied continuously when the luminance is compressed.

The luminance signal appropriately compressed by the compression circuit 15 and the color-difference signals output from the AGC circuit 5 are applied to the encoder circuit 6 and are therefrom output as a standard television signal. Also, when the color signals are superimposed on the luminance signal, the compression of the luminance signal serves to make the colors of the high luminance portions look denser to the visual sense, thereby giving an additional advantage that without increasing the color saturation degree, an equivalent result is obtained. For this reason, the apparent color dynamic range is extended.

As has been described above, according to the invention, the image sensing apparatus, in backlighting photographic situations, can compensate for the backlighting, and improve the latitude of the high luminance portions without causing the image quality to be deteriorated, thus making it possible to get natural, high grade of imagery.

While in the above-described first embodiment, the levels of the luminance signals obtained from a plurality of detecting areas of different sizes within the image sensing plane are computed on detection of occurrence of a backlighting state to automatically effect the backlighting compensation, a second embodiment is arranged such that according to the intention of the photographer, the backlighting compensation can be made arbitrarily by using an external over-exposure switch 18, and an external under-exposure switch 19.

Figure 5:
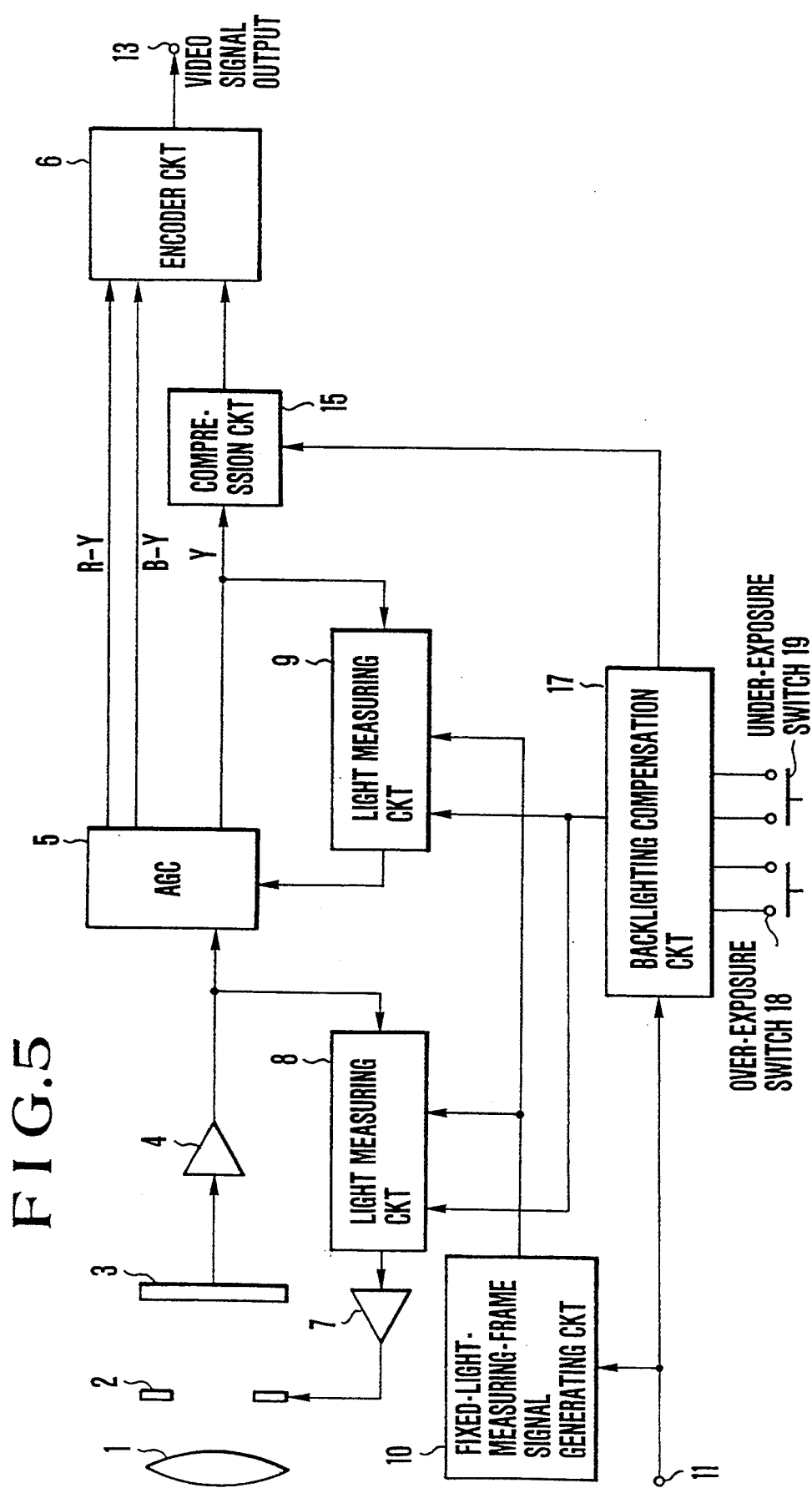
FIG. 5 is a block diagram of a second embodiment of the invention.

FIG. 5 is a block diagram of the construction of the second embodiment of the invention. In FIG. 5, the same constituent parts as those of the first embodiment of FIG. 2 are denoted by the same reference numerals and their explanation is omitted.

In FIG. 5, a backlighting compensation circuit 17 is provided with an external over-exposure switch 18 and an external under-exposure switch 19. By selectively operating these external switches 18 and 19, the photographer can set a desired amount of compensation in the backlighting compensation circuit 17, from which the output representing it is continuously produced. This output is applied to the aforesaid compression circuit 15, where, similarly to the first embodiment, the compression start point and the compression rate of the high-luminance signal are controlled in accordance with the amount of compensation (see FIG. 4) so as to thereby improve the latitude of the high luminance portions.

Even in such a manually operated apparatus of setting the amount of compensation for backlighting, the high luminance compression is performed depending on the amount of compensation for backlighting. Therefore, without causing the image quality to deteriorate, the compensation for backlighting can be carried out to an optimum.

As has been described above, according to the image sensing apparatus in the invention, when the backlighting compensation is performed, the high luminance signal starts to be compressed from an appropriate point and at an appropriate rate in accordance with the required amount of compensation, so that the high luminance portions other than the object which would otherwise be emphasized to be washed out can be imaged with an improved latitude and improved coloring, and, due to the extended dynamic range of the luminance signal, an optimum exposure control can be made.

What is claimed is:

1. An image sensing apparatus comprising:
   (A) light measuring means for performing a weighted light measurement on the basis of a light measuring frame set in a predetermined position within an image sensing plane of an image sensor;
   (B) detecting means for detecting luminance signal levels obtained from a plurality of detecting areas set on the image sensing plane;
   (C) compensating means for compensating a light measuring result of said light measuring means to compensate a backlighting photographic state in the case where the object state is discriminated to be a backlighting photographic state; and
   (D) compression means for compressing a high-luminance signal in an output signal of said image sensor in accordance with an amount of compensation of said compensating means in said backlighting photographic state.

2. An apparatus according to claim 1, wherein said compression control means controls a position of start of compression of the high-luminance signal.

3. An apparatus according to claim 1 or 2, wherein said compression control means controls a compression rate of the high-luminance signal.

4. An apparatus according to claim 3, wherein said compression control means suppresses a high luminance portion emphasized by being compensated for backlighting by said compensating means.

5. An apparatus according to claim 4, wherein said compression control means compresses the luminance signal level stepwise in accordance with the amount of compensation performed by said compensating means.

6. An apparatus according to claim 1, wherein said compensation means discriminates whether a photographed image is in a backlighting, or normal or overfrontlighting state on the basis of the luminance signal levels of the plurality of detecting areas set within the image sensing plane.

7. An apparatus according to claim 6, wherein said compensation means computes luminance levels of the entire image sensing plane and a substantially central portion area thereof as the detecting areas according to predetermined computation formulas, and discriminates a state of the image.

8. An apparatus according to claim 7, wherein said central portion area as the detecting area is set downwardly away from a central portion of the image sensing plane, and includes a central area and two areas respectively aside said central area.

9. An apparatus according to claim 8, wherein, when letting the entire area of the image sensing frame be denoted by C, said central area by A and said two side areas by B, said discriminating means determines the image to be in a backlighting state when a value obtained by subtracting a luminance level of the area A from a mean luminance level of the areas A+B is larger than a predetermined level X, and when a value obtained by subtracting the luminance level of the area A from a mean luminance level of the side areas B+the are LC is larger than a predetermined level Y.

10. An image sensing apparatus comprising:
   (A) light measuring means for performing a weighted light measurement on the basis of a light measuring frame set in a predetermined position within an image sensing plane of an image sensor;
   (B) compensating means for manually compensating a light measurement signal output from said light measuring means in a photographic state; and
   (C) compression means for compressing a high-luminance signal in an output signal of said image sensor in accordance with an amount of compensation of said compensating means in said photographic state.

11. An apparatus according to claim 10, wherein said compensating means includes backlighting compensating means for compensating for blackening of an image of an object being photographed in a backlighting photographic state.

12. An apparatus according to claim 11, wherein said control means performs compression of high luminance to prevent occurrence of washing out in such a way as to compress a high luminance level which has been heightened by a backlighting compensating operation of said backlighting compensating means.

13. An apparatus according to claim 10, wherein said control means controls a position of start of compression of the high-luminance signal.

14. An apparatus according to claim 10 or 13, wherein said control means controls a compression rate of the high-luminance signal.

15. An apparatus according to claim 14, wherein said control means suppresses a high luminance level emphasized by being compensated for backlighting by said compensating means.

16. An apparatus according to claim 15, wherein said control means compresses a luminance signal level stepwise in accordance with the amount of compression performed by said compressing means.

17. A video camera apparatus comprising:
(A) image sensing means for photoelectrically converting an entering image to produce an image sensing signal;
(B) detecting means for detecting luminance signal levels obtained from a plurality of detecting areas set in an image sensing frame of said image sensing means;
(C) discriminating means for discriminating a photographic state on the basis of an output of said detecting means;
(D) compensating means for performing backlighting compensating on a detection signal output from said detecting means; and
(E) compression control means for controlling a compression rate of a high-luminance signal in an output signal of said image sensing means in accordance with an amount of compensation performed by said compensating means in a backlighting photographic state.

18. An apparatus according to claim 17, wherein said compression control means controls a position of start of compression of the high-luminance signal.

19. An apparatus according to claim 18, wherein said compression control means compresses a luminance signal level stepwise in accordance with the amount of compensation performed by said compensating means.

20. An apparatus according to claim 17, wherein said discriminating means discriminates whether a photographed image is in a backlighting, normal or over-frontlighting state on the basis of the luminance signal levels of the plurality of detecting areas set in the image sensing frame.

21. An apparatus according to claim 20, wherein said discriminating means computes luminance levels of the entire image sensing frame and a substantially central portion are thereof as the detecting areas according to predetermined formulas to discriminate a state of the image, including backlighting, normal and over-frontlighting states, and wherein the central portion area is set downwardly away from a central portion of the image sensing plane, and includes a central area and two areas aside said central area.

22. An apparatus according to claim 21, wherein when letting the entire area of the image sensing frame be denoted by C, said central area by A, said two side areas by B, said discriminating means determines the image to be in a backlighting state, when a value obtained by subtracting a luminance level of the area A from a mean luminance level of the areas A+B is larger than a predetermined level X, and when a value obtained by subtracting the luminance level of the area A from a mean luminance level of the two side areas B+the are C is larger than a predetermined level Y.

23. An image sensing apparatus comprising:
(A) light measuring means for detecting luminance signal levels obtained from a plurality of detecting areas set within an image sensing plane of an image sensor and performing a light measurement operation on the basis of the luminance signal levels;
(B) compensating means for discriminating a photographic state on the basis of the luminance signal levels and compensating a light measurement signal output from said light measuring means; and
(C) compression means for compressing a high-luminance signal level in an output signal of said image sensor in accordance with an output of said compensating means.

24. An apparatus according to claim 23, wherein said compression means is arranged to suppress a level of a high-luminance portion which has been emphasized by exposure correction effected by said compensating means.

25. An apparatus according to claim 23, wherein said compensating means is arranged to discriminate a backlighting state, a normal state or an overlighting state of the image sensing plane on the basis of the respective luminance levels of said plurality of detecting areas.

26. An apparatus according to claim 23, wherein said plurality of detecting areas comprise a central area and side areas at both sides thereof.

27. An apparatus according to claim 26, wherein, when letting the entire area of the image sensing plane be denoted by C, said central area by A and said two side areas by B, said compensating means determines the image sensing plane to be in a backlighting state when a value obtained by subtracting a luminance level of the area A from a mean luminance level of the areas A+B is larger than a predetermined level X and a value obtained by subtracting the luminance level of the area A from a mean luminance level of the side areas B+the area C is larger than a predetermined level Y.

28. A video camera apparatus comprising:
(A) light measuring means for detecting luminance levels at a plurality of points of an input image and output a light measurement signal on the basis of the luminance levels;
(B) compensating means for discriminating a photographic state on the basis of the luminance signal levels and compensating a light measurement signal output from said light measuring means; and
(C) compression means for compressing a high-luminance signal level in an output signal of said image sensor in accordance with an output of said compensating means.

29. An apparatus according to claim 28, wherein said compression means is arranged to suppress a level of a high luminance portion which has been emphasized by exposure correction effected by said compensating means.

30. An apparatus according to claim 28, wherein said compensating means is arranged to discriminate a backlighting state, a normal lighting state or an overlighting state of the image sensing plane on the basis of the respective luminance levels of said plurality of detecting areas and to effect exposure correction when the state of the image sensing plane is not normal.

31. An apparatus according to claim 23, wherein said plurality of detecting areas comprises a central area and side areas at both sides thereof, and when letting the entire area of the image sensing plane as denoted by C, said central area by A and said two side areas by B, said compensating means determines the image sensing plane to be in a backlighting state when a value obtained by subtracting a luminance level of the area A from a mean luminance level of the areas A+B is larger than a predetermined level X, and a value obtained by subtracting the luminance level of the area A from a mean luminance level of the side areas B+the area C is larger than a predetermined level Y.

* * * * *

UNITED STATES PATENT AND TRADEMARK OFFICE
CERTIFICATE OF CORRECTION

PATENT NO. : 5,343,246

DATED : August 30, 1994

INVENTOR(S) : Hideyuki Arai et al.

It is certified that error appears in the above-identified patent and that said Letters Patent is hereby corrected as shown below:

Col. 1, line 63. Change "through, circuits 8 and 9" to -- through circuits 8 and 9, --.

Col. 2, line 19. Delete "to".

Col. 2, line 30. After "assures" insert -- the --.

Col. 2, line 31. Change "making always" to -- always making --.

Col. 3, line 6. Delete "from".

Col. 3, line 61. After "of" insert -- the --.

Col. 3, line 68. Change "through, circuits 8 and 9" to -- through circuits 8 and 9, --.

Col. 5, line 12. Change "each are" to -- are each --.

Col. 5, line 42. Change "other area" to -- area other --.

Col. 8, line 55. Change "are LC" to -- area C --.

UNITED STATES PATENT AND TRADEMARK OFFICE
CERTIFICATE OF CORRECTION

PATENT NO. : 5,343,246
DATED : August 30, 1994
INVENTOR(S) : Hideyuki Arai et al It is certified that error appears in the above-indentified patent and that said Letters Patent is hereby corrected as shown below:

Col. 10, line 11. Change "are" to --area--.

Signed and Sealed this

Seventeenth Day of January, 1995

Attest:

BRUCE LEHMAN

Attesting Officer

Commissioner of Patents and Trademarks